(12) United States Patent
Salter et al.

(10) Patent No.: US 9,499,090 B2
(45) Date of Patent: Nov. 22, 2016

(54) SPOILER USING PHOTOLUMINESCENT ILLUMINATION

(71) Applicant: Ford Global Technologies, LLC, Dearborn, MI (US)

(72) Inventors: Stuart C. Salter, White Lake, MI (US); Michael James Whitens, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 14/617,177

(22) Filed: Feb. 9, 2015

(65) Prior Publication Data

US 2015/0151673 A1    Jun. 4, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.

| | |
|---|---|
| *F21V 11/00* | (2015.01) |
| *B60Q 1/26* | (2006.01) |
| *B60Q 1/24* | (2006.01) |
| *B60Q 1/30* | (2006.01) |
| *F21S 8/10* | (2006.01) |
| *B60Q 1/50* | (2006.01) |
| *B60Q 1/44* | (2006.01) |
| *H05B 33/08* | (2006.01) |

(52) U.S. Cl.
CPC ............... *B60Q 1/2607* (2013.01); *B60Q 1/24* (2013.01); *B60Q 1/2661* (2013.01); *B60Q 1/30* (2013.01); *F21S 48/214* (2013.01); *F21S 48/217* (2013.01); *B60Q 1/44* (2013.01); *B60Q 1/50* (2013.01); *B60Q 2400/20* (2013.01); *B60Q 2400/30* (2013.01); *B60Q 2400/40* (2013.01); *H05B 33/0803* (2013.01)

(58) Field of Classification Search
CPC .... B60Q 1/24; B60Q 1/2607; B60Q 1/2661; B60Q 1/30; B60Q 1/44; B60Q 1/50; F21S 48/214; F21S 48/217
USPC ........................................ 362/487, 510–511
See application file for complete search history.

(56) References Cited

U.S. PATENT DOCUMENTS

| | | |
|---|---|---|
| 5,119,068 A | 6/1992 | Nagai et al. |
| 5,709,453 A | 1/1998 | Krent et al. |
| 5,851,840 A | 12/1998 | Sluka et al. |
| 6,117,362 A | 9/2000 | Yen et al. |
| 6,577,073 B2 | 6/2003 | Shimizu et al. |

(Continued)

FOREIGN PATENT DOCUMENTS

| | | |
|---|---|---|
| CN | 201102500 Y | 8/2008 |
| CN | 201169230 Y | 12/2008 |

(Continued)

*Primary Examiner* — Jason Moon Han
(74) *Attorney, Agent, or Firm* — Jason Rogers; Price Heneveld LLP

(57) ABSTRACT

An illumination system for a vehicle includes a rear spoiler with first and second photoluminescent portions disposed on the spoiler and at least one light source configured to emit an emission at a first wavelength. The first and second photoluminescent portions are configured to convert the first wavelength to at least a second wavelength longer than the first wavelength.

19 Claims, 6 Drawing Sheets

(56) References Cited

U.S. PATENT DOCUMENTS

| | | |
|---|---|---|
| 6,729,738 B2 | 5/2004 | Thompson et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,063,375 B2 | 6/2006 | Dringenberg et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,589,622 B2 | 9/2009 | Farley |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,113,695 B2 | 2/2012 | Meinke et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 101337492 A | 1/2009 |
| CN | 201193011 Y | 2/2009 |
| DE | 29708699 U1 | 7/1997 |
| DE | 101292021 A1 | 9/2002 |
| DE | 10319396 A1 | 11/2004 |
| DE | 202005017408 U1 | 1/2006 |
| DE | 102005055702 A1 | 5/2007 |
| EP | 0719672 B1 | 12/1999 |
| EP | 1793261 A1 | 6/2007 |
| EP | 2778209 A1 | 9/2014 |
| JP | 61160331 A | 7/1986 |
| JP | 2000159011 A | 6/2000 |
| JP | 2007238063 A | 9/2007 |
| WO | 2006047306 A1 | 5/2006 |
| WO | 2014068440 A1 | 5/2014 |

SPOILER USING PHOTOLUMINESCENT ILLUMINATION

CROSS-REFERENCE TO RELATED APPLICATIONS

This application is a continuation-in-part of U.S. patent application Ser. No. 14/603,636, filed on Jan. 23, 2015, entitled "DOOR ILLUMINATION AND WARNING SYSTEM," which is a continuation-in-part of U.S. patent application Ser. No. 14/086,442 filed on Nov. 21, 2013, entitled "VEHICLE LIGHTING SYSTEM WITH PHOTOLUMINESCENT STRUCTURE. The aforementioned related applications are hereby incorporated by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present disclosure, an illumination system for a vehicle includes a rear spoiler with first and second photoluminescent portions disposed on the spoiler and at least one light source configured to emit an emission at a first wavelength. The first and second photoluminescent portions are configured to convert the first wavelength to at least a second wavelength longer than the first wavelength.

According to another aspect of the present disclosure, an illumination system for a vehicle includes a body feature, a photoluminescent portion disposed on an underside of the body feature and a light source located proximate the photoluminescent portion configured to emit light at a first wavelength. The photoluminescent portion is configured to convert the first wavelength to at least a second wavelength longer than the first wavelength to illuminate a rear portion of the vehicle.

According to yet another aspect of the present disclosure, a method for illuminating an exterior of a vehicle includes activating a light source in response to a pre-defined event and directing light at a first wavelength from the light source toward a photoluminescent portion disposed on a rear spoiler and converting light at the first wavelength to a second wavelength with the photoluminescent portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination system for a vehicle configured to illuminate a portion of the vehicle as well as a surface beneath a vehicle. In some embodiments, a light source may be utilized to illuminate both the surface beneath the vehicle and the vehicle. The light source may be configured to emit light at a first wavelength or primary emission to excite a photoluminescent structure. The photoluminescent structure may be disposed on a body feature of the vehicle and be configured to convert the first wavelength of the light or the primary emission into a second wavelength or secondary emission. The first wavelength of the light may correspond to a first color of light and the second wavelength may correspond to a second color of light, different from the first color. While the various embodiments of the illumination system described herein refer to specific structures demonstrated in reference to at least one automotive vehicle, it will be appreciated that the vehicle illumination system may be utilized in a variety of applications.

Figure 1A:
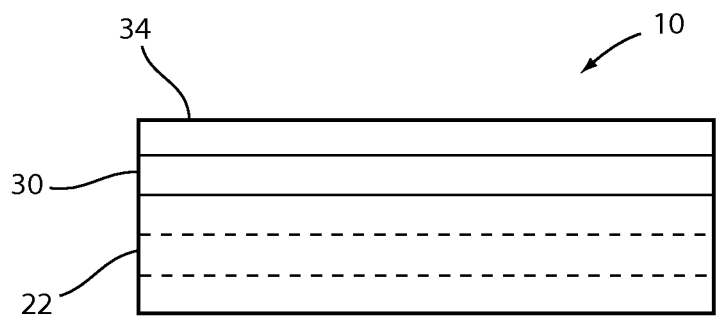
FIG. 1A is a side view of a photoluminescent structure rendered as a coating for an illumination system.
Figure 1B:
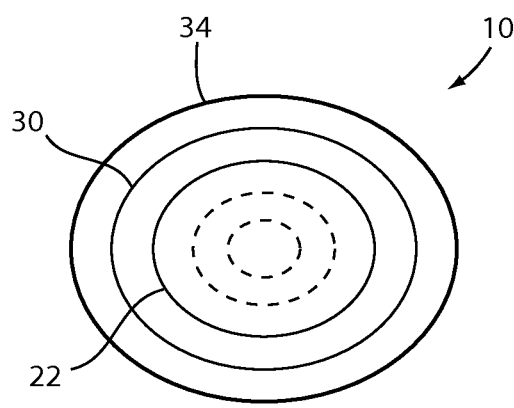
FIG. 1B is a top view of the photoluminescent structure rendered as a discrete particle for the illumination system.
Figure 1C:
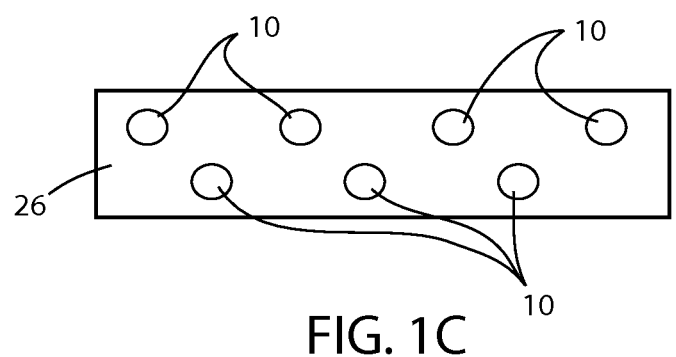
FIG. 1C is a side view of a plurality of photoluminescent structures rendered as discrete particles and incorporated into a separate structure for the illumination system.

Referring to FIGS. 1A-1C, a photoluminescent structure 10 is generally shown rendered as a coating (e.g., a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 10 may correspond to one or more photoluminescent portions as discussed herein. The photoluminescent portions are configured to convert a first wavelength of the light emitted from a light source 18 to at least a second wavelength. The second wavelength of the light may correspond to at least one wavelength having a longer wavelength or spectral emission than the first wavelength. At the most basic level, the photoluminescent structure 10 includes an energy conversion layer 22 that may be provided as a single layer or a multilayer structure, as shown through broken lines in FIGS. 1A and 1B.

The energy conversion layer 22 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various embodiments discussed herein, each of the wavelengths of light (e.g. the first wavelength, etc.) corresponds to electromagnetic radiation utilized in the conversion process.

The energy conversion layer 22 may be prepared by dispersing the photoluminescent material in a polymer matrix 26 to form a homogenous mixture using a variety of methods. Such methods may include preparing the energy conversion layer 22 from a formulation in a liquid carrier medium and coating the energy conversion layer 22 to a desired planar and/or non-planar substrate of a vehicle fixture. The energy conversion layer 22 coating may be deposited on a vehicle fixture by painting, screen printing, pad printing, spraying, slot coating, dip coating, roller coating, and bar coating. Additionally, the energy conversion layer 22 may be prepared by methods that do not use a liquid carrier medium.

For example, a solid state solution (homogenous mixture in a dry state) of one or more photoluminescent materials may be incorporated in a polymer matrix 26 to provide the energy conversion layer 22. The polymer matrix 26 may be formed by extrusion, injection molding, compression molding, calendaring, thermoforming, etc. In instances where one or more energy conversion layers 22 are rendered as particles, the single or multi-layered energy conversion layers 22 may be implanted into a vehicle fixture or panel. When the energy conversion layer 22 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 1A and 1B, the photoluminescent structure 10 may optionally include at least one stability layer 30 to protect the photoluminescent material contained within the energy conversion layer 22 from photolytic and thermal degradation. The stability layer 30 may be configured as a separate layer optically coupled and adhered to the energy conversion layer 22. The stability layer 30 may also be integrated with the energy conversion layer 22. The photoluminescent structure 10 may also optionally include a protective layer 34 optically coupled and adhered to the stability layer 30 or any layer or coating to protect the photoluminescent structure 10 from physical and chemical damage arising from environmental exposure.

The stability layer 30 and/or the protective layer 34 may be combined with the energy conversion layer 22 to form an integrated photoluminescent structure 10 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 10. Once formed, the photoluminescent structure 10 may be applied to a chosen vehicle fixture.

In some embodiments, the photoluminescent structure 10 may be incorporated into a vehicle fixture as one or more discrete multilayered particles as shown in FIG. 1C. The photoluminescent structure 10 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 2:
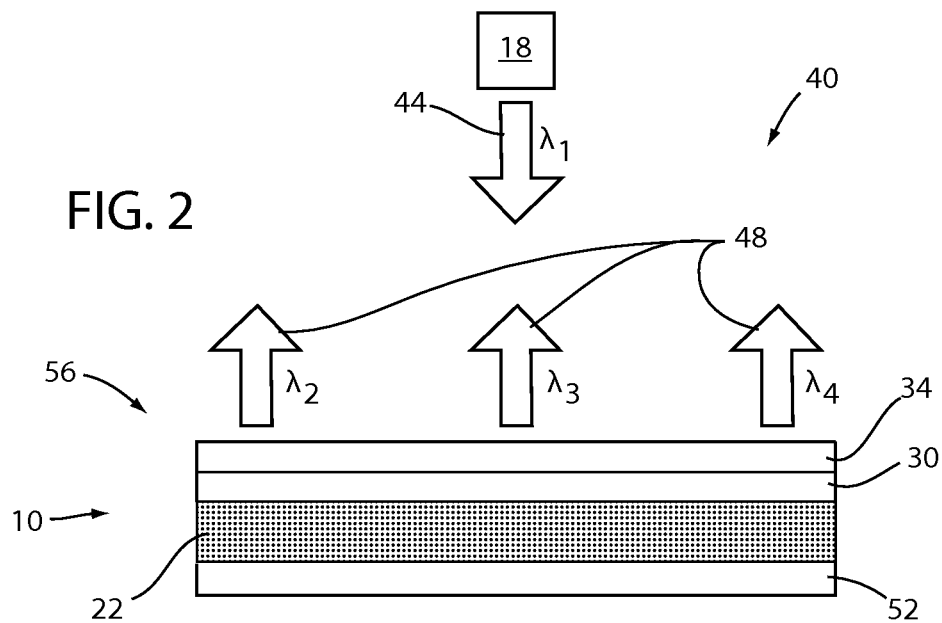
FIG. 2 is a schematic diagram of a vehicle illumination system configured to convert a first emission of light to a second emission of light according to one embodiment.

Referring to FIG. 2, an illumination system 40 is generally shown in one embodiment according to a front-lit configuration to convert a first emission 44 from the light source 18 to a second emission 48. The first emission 44 comprises a first wavelength $\lambda 1$, and the second emission 48 comprises a second wavelength $\lambda 2$. The illumination system 40 may include the photoluminescent structure 10 rendered as a coating and applied to a substrate 52 of a vehicle fixture 56. The photoluminescent structure 10 may include the energy conversion layer 22, and in some embodiments may include the stability layer 30 and/or protective layer 34. In response to the light source 18 being activated, the first emission 44 is converted from the first wavelength $\lambda 1$ to the second emission 48 having at least the second wavelength $\lambda 2$. The second emission 48 may comprise a plurality of wavelengths $\lambda 2$, $\lambda 3$, $\lambda 4$ configured to emit substantially white light from the vehicle fixture 56.

In various embodiments, the illumination system 40 comprises at least one energy conversion layer 22 configured to convert the first emission 44 at the first wavelength $\lambda 1$ to the second emission 48 having at least the second wavelength $\lambda 2$. In order to generate the plurality of wavelengths $\lambda 2$, $\lambda 3$, $\lambda 4$, the energy conversion layer 22 may comprise a red-emitting photoluminescent material, a green-emitting photoluminescent material, and a blue-emitting photoluminescent material dispersed in the polymer matrix 26 (FIG. 1C). The red, green, and blue-emitting photoluminescent materials may be combined to generate the significantly white light for the second emission 48. Further, the red, green, and blue-emitting photoluminescent materials may be utilized in a variety of proportions and combinations to control the color of the second emission 48.

Each of the photoluminescent materials may vary in output intensity, output wavelength, and peak absorption wavelengths based on a particular photochemical structure and combinations of photochemical structures utilized in the energy conversion layer 22. As an example, the second emission 48 may be changed by adjusting the wavelength of the first emission λ1 to activate the photoluminescent materials at different intensities to alter the color of the second emission 48. In addition to or alternatively to the red, green, and blue-emitting photoluminescent materials, other photoluminescent materials may be utilized alone and in various combinations to generate the second emission 48 in a wide variety of colors. In this way, the illumination system 40 may be configured for a variety of applications to provide a desired lighting color and effects.

The light source 18 may also be referred to as an excitation source and is operable to emit at least the first emission 44. The light source 18 may comprise any form of light source, for example halogen lighting, fluorescent lighting, light emitting diodes (LEDs), organic LEDs (OLEDs), polymer LEDs (PLEDs), printed LED sheets, solid state lighting or any other form of lighting configured to output the first emission 44. The first emission 44 from the light source 18 may be configured such that the first wavelength λ1 corresponds to at least one absorption wavelength of the one or more photoluminescent materials of the energy conversion layer 22. In response to receiving the light at the first wavelength λ1, the energy conversion layer 22 may be excited and output the one or more output wavelengths λ2, λ3, and λ4. The first emission 44 provides an excitation source for the energy conversion layer 22 by targeting absorption wavelengths of the various photoluminescent materials utilized therein. As such, the illumination system 40 is configured to output the second emission 48 to generate a desired light intensity and color.

Though the plurality of wavelengths is referred to as the wavelengths λ2, λ3, λ4, the photoluminescent materials may be combined in various proportions, types, layers, etc. to generate a variety of colors for the second emission 48. The photoluminescent materials may also be utilized in a plurality of photoluminescent portions distributed along a path of the first emission 44 to generate any number of emissions, for example a third emission, a fourth emission, etc.

In an exemplary embodiment, the light source 18 comprises an LED configured to emit the first wavelength λ1 which corresponds to a blue spectral color range. The blue spectral color range comprises a range of wavelengths generally expressed as blue light (~440-500 nm). In some embodiments, the first wavelength λ1 may also comprise wavelengths in a near ultraviolet color range (~390-450 nm). In an exemplary embodiment, λ1 may be approximately equal to 470 nm. In some embodiments, the first wavelength λ1 may be approximately less than 500 nm such that the first wavelength of the light is not significantly visible.

The blue spectral color range and shorter wavelengths may be utilized as an excitation source for the illumination system 40 due to these wavelengths having limited perceptual acuity in the visible spectrum of the human eye. By utilizing shorter wavelengths for the first wavelength λ1, and converting the first wavelength with the conversion layer 22 to at least one longer wavelength, the illumination system 40 creates a visual effect of light originating from the photoluminescent structure 10. In this configuration, light is emitted from the photoluminescent structure 10 from locations that may be inaccessible or costly to add conventional light sources requiring electrical connections.

As discussed herein, each of the plurality of wavelengths λ2, λ3, λ4 may correspond to a significantly different spectral color range. The second wavelength λ2 may correspond to the excitation of a red-emitting photoluminescent material having a wavelength in the range of approximately 620-750 nm. The third wavelength λ3 may correspond to the excitation of a green emitting photoluminescent material having a wavelength in the range of approximately 526-606 nm. The fourth wavelength λ4 may correspond to a blue or blue green emitting photo luminescent material having a wavelength longer than the first wavelength λ1 and in the range of approximately 430-526 nm. Though the wavelengths λ2, λ3, λ4 are discussed herein as being utilized to generate a significantly white light, various combinations of photoluminescent materials may be utilized in the conversion layer 22 to convert the first wavelength λ1 to one or more wavelengths corresponding to a variety of colors.

In some embodiments, a color of the ambient glow perceived by an onlooker may be altered by adjusting an intensity or energy output level of the light source 18. For example, if the light source 18 is configured to output the first emission 44 at a low level, substantially all of the first emission 44 may be converted to the second emission 48. In this configuration, a color of light corresponding to the second emission 48 may correspond to the color of the ambient glow. If the light source 18 is configured to output the first emission 44 at a high level, only a portion of the first emission 44 may be converted to the second emission 48. In this configuration, a color of light corresponding to a mixture of the first emission 44 and the second emission 48 may be output as the ambient glow.

Though a low level and a high level of intensity are discussed in reference to the first emission 44, it shall be understood that the intensity of the first emission 44 may be varied among a variety of intensity levels to adjust a hue of the color corresponding to the ambient glow. As described herein, the color of the second emission 48 may be significantly dependent on the particular photoluminescent materials utilized in the photoluminescent portions or photoluminescent structure 10. Additionally, a conversion capacity of the photoluminescent structure 10 may be significantly dependent on a concentration of the photoluminescent materials utilized in the photoluminescent structure 10. By adjusting the range of intensities that may be output from the light source 18, the concentration and proportions of the photoluminescent materials in the photoluminescent structure 10, and the types of photoluminescent materials utilized in the photoluminescent structure 10, the illumination systems discussed herein may be operable to generate a range of color hues of the ambient glow by blending the first emission 44 with the second emission 48.

Figure 3:
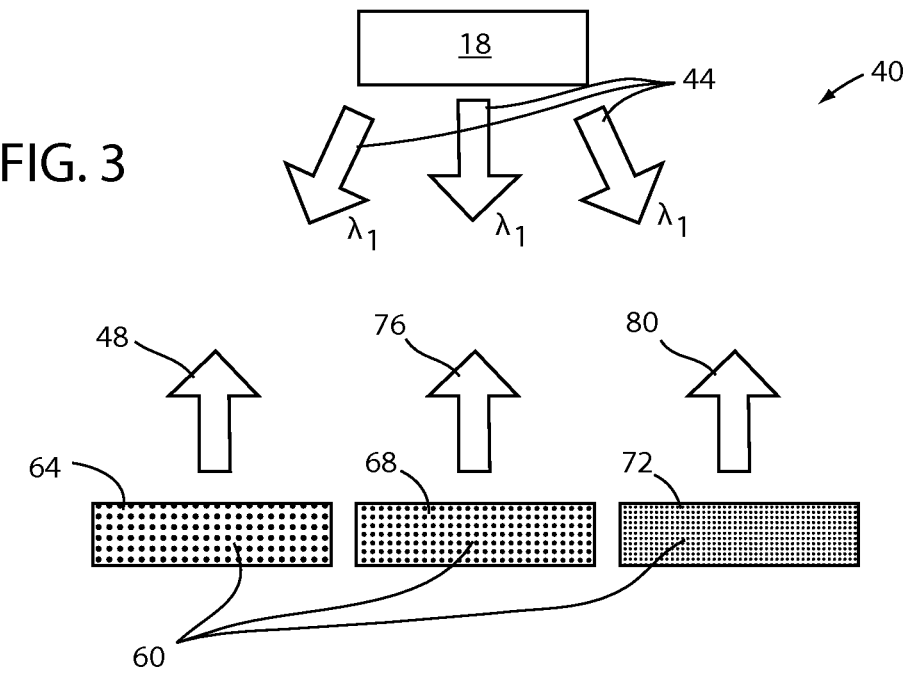
FIG. 3 is a schematic diagram of a vehicle illumination system configured to convert a first emission of light to a plurality of emissions of light according to another embodiment.

Referring to FIG. 3, the illumination system 40 is shown in the front-lit configuration according to another embodiment. In this exemplary embodiment, the light source 18 may be configured to emit the first emission 44 toward a plurality of photoluminescent portions 60 which are similar to the photoluminescent structure 10. In this example, the plurality of photoluminescent portions 60 comprises a first photoluminescent portion 64, a second photoluminescent portion 68, and a third photoluminescent portion 72. Each of the photoluminescent portions 64, 68, 72 may be configured to convert the first wavelength λ1 of the first emission 44 to one or more of the plurality of wavelengths λ2, λ3, λ4. In this way, the first emission 44 may be converted into a plurality of emissions originating from each of the plurality of photoluminescent portions 60 to generate a multicolored lighting effect.

For example, the first photoluminescent portion 64 may comprise photoluminescent materials in a conversion layer configured to generate the second emission 48. The second photoluminescent portion 68 may comprise photoluminescent materials in a conversion layer configured to generate a third emission 76. The third photoluminescent portion 72 may comprise photoluminescent materials in a conversion layer configured to generate a fourth emission 80. Similar to the energy conversion layer 22, discussed in reference to FIG. 2, photoluminescent materials configured to emit light of various colors may be utilized in a variety of proportions and combinations to control the output color of each of the second emission 48, the third emission 76, and the fourth emission 80. Based on a desired lighting effect, each of the portions 64, 68, 72 may comprise photoluminescent material configured to emit light having substantially similar colors, or a wide variety of color combinations.

Figure 4:
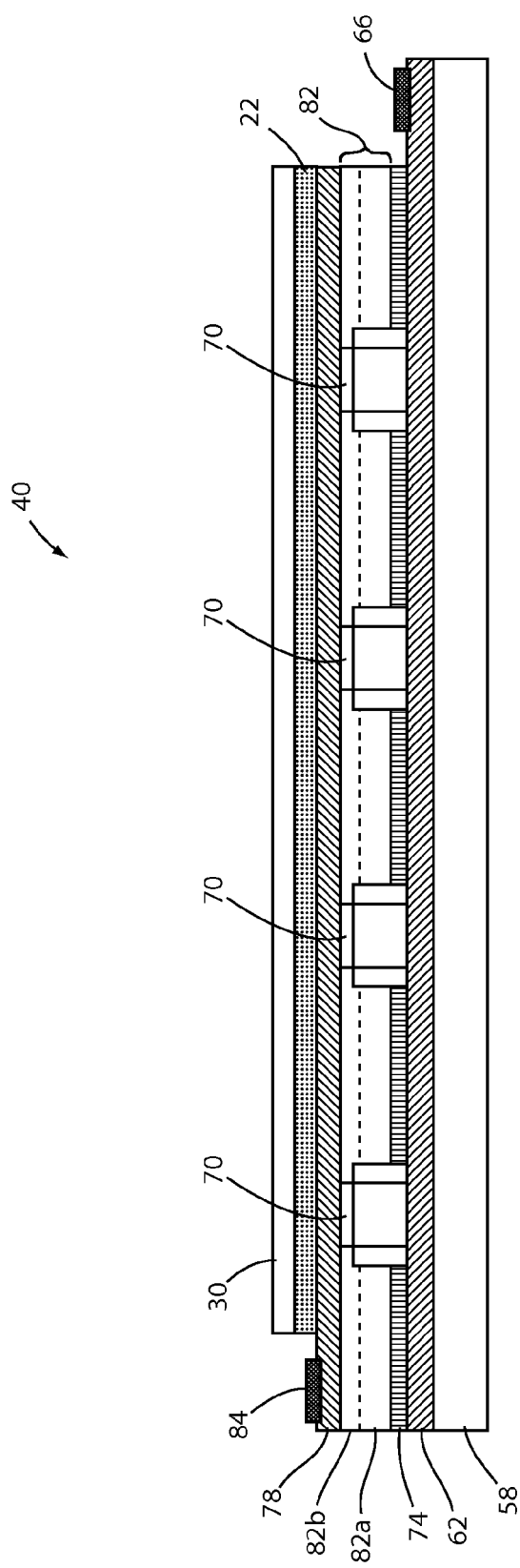
FIG. 4 is a schematic diagram of a vehicle illumination system configured to convert a first emission of light to a second emission of light according to a further embodiment.

Referring to FIG. 4, the illumination system 40 is shown in a substantially backlit configuration. In this exemplary embodiment, the light source 18 may correspond to a thin-film or printed light emitting diode (LED) assembly. The illumination system 40 may comprise a lighting substrate 58. The lighting substrate 58 may be opaque, transparent, or semi-transparent and may be thin. The illumination system 40 may be utilized in a variety of applications, which may require a thin overall thickness. The substrate 58 may be of a polymer, for example polycarbonate, polymethylmethacrylate (PMMA), polyethylene terephthalate (PET), etc. In some embodiments, the lighting substrate 58 may be dispensed from a roll to provide for integration into assembly operations for the illumination system 40 and may be approximately 0.005 to 0.060 inches thick.

A first electrode 62 or conductive layer may be disposed on the lighting substrate 58. The first electrode 62 and/or various electrodes or conductive layers discussed herein may comprise a conductive epoxy, such as a silver-containing or copper-containing epoxy. The first electrode 62 is conductively connected to a first bus bar 66. The first bus bar 66 and other bus bars or conduits discussed herein may be of metallic and/or conductive materials which may be screen printed on the electrodes or conductive layers. Bus bars may be utilized in the illumination system 40 to conductively connect a plurality of light-emitting diode (LED) sources 70 to a power source. In this way, the first bus bar 66, and other bus bars utilized in the illumination system 40, may be configured to uniformly deliver current along and/or across a surface of the illumination system 40.

The LED sources 70 may be printed, dispersed or otherwise applied to the first electrode 62 via a semiconductor ink 74. The LED sources 70 may be dispersed in a random or controlled fashion within the semiconductor ink 74. The LED sources 70 may correspond to micro-LEDs of gallium nitride elements, which may be approximately 5 microns to 400 microns across a width substantially aligned with the surface of the first electrode 62. The semiconductor ink 74 may include various binding and dielectric materials including but not limited to one or more of gallium, indium, silicon carbide, phosphorous and/or translucent polymeric binders. In this configuration, the semiconductor ink 74 may contain various concentrations of LED sources 70 such that a surface density of the LED sources 70 may be adjusted for various applications.

In some embodiments, the LED sources 70 and semiconductor ink 74 may be sourced from Nth Degree Technologies Worldwide Inc. The semiconductor ink 74 can be applied through various printing processes, including ink jet and silk screen processes to selected portion(s) of the lighting substrate 58. More specifically, it is envisioned that the LED sources 70 are dispersed within the semiconductor ink 74 and shaped and sized such that a substantial quantity of them preferentially align with the first electrode 62 and a second electrode 78 during deposition of the semiconductor ink 74. The portion of the LED sources 70 that ultimately are electrically connected to the electrodes 62, 78 may be illuminated by a voltage source applied across the first electrode 62 and the second electrode 78. In some embodiments, a power source operating at 12 to 16 VDC from a vehicular power source may be employed as a power source to supply current to the LED sources 70.

At least one dielectric layer 82 may be printed over the LED sources 70 to encapsulate and/or secure the LED sources 70 in position. The at least one dielectric layer 82 may correspond to a first dielectric layer 82a and a second dielectric layer 82b, which may be of a transparent material. The second electrode 78 may correspond to a top transparent conductor layer printed over the dielectric layer 82 to electrically connect the electrodes 62, 78. The second electrode 78 is conductively connected to a second bus bar 84. The bus bars 66, 84 may be utilized in the illumination system 40 to conductively connect the plurality of light-emitting diode (LED) sources 70 to the power source.

In some embodiments, the first electrode 62 and the second electrode 78 may correspond to a cathode electrode and an anode electrode, respectively. Though described as a cathode and an anode of the illumination system 40, the first electrode 62 and the second electrode 78 may be arranged such that the second electrode 78 (anode) is disposed on the substrate 58 and the first electrode 62 (cathode) is disposed on the at least one dielectric layer 82. The bus bars 66, 84 may be printed along opposite edges of the electrodes 62, 78 and electrically terminate at anode and cathode leads. Points of connection between the bus bars 66, 84 and the power source may be at opposite corners of each bus bar 66, 84 for uniform current distribution along each bus.

Still referring to FIG. 4, the energy conversion layer 22 may be applied to the second electrode 78. The energy conversion layer 22 may be applied as a coating, layer, film, and/or photoluminescent substrate. The energy conversion layer 22 may be applied by screen printing, flexography, and/or otherwise affixed to the second electrode 78. In various implementations, the LED sources 70 may be configured to emit the first emission 44. The LED sources 70 may be configured to emit the first emission 44 into the energy conversion layer 22 such that the photoluminescent material becomes excited. In response to the receipt of the first emission 44, the photoluminescent material converts the excitation emission from the first wavelength to the second emission comprising at least a second wavelength longer than the first wavelength. It should be noted that the plurality of photoluminescent portions 60 may be used and excited to emit the second emission 48, third emission 76 and fourth emission 80 in a similar manner as described in connection with the energy conversion layer 22. Additionally, one or more coatings of the stability layer 30 may be applied to the illumination system 40 to protect the energy conversion layer 22 and various other parts of the system 40 from damage and wear.

To achieve the various colors and combinations of photoluminescent materials described herein, the illumination system 40 may utilize any form of photoluminescent materials according to various embodiments, for example phospholuminescent materials according to various embodiments, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINES- CENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are incorporated herein by reference in their entirety.

Figure 5:
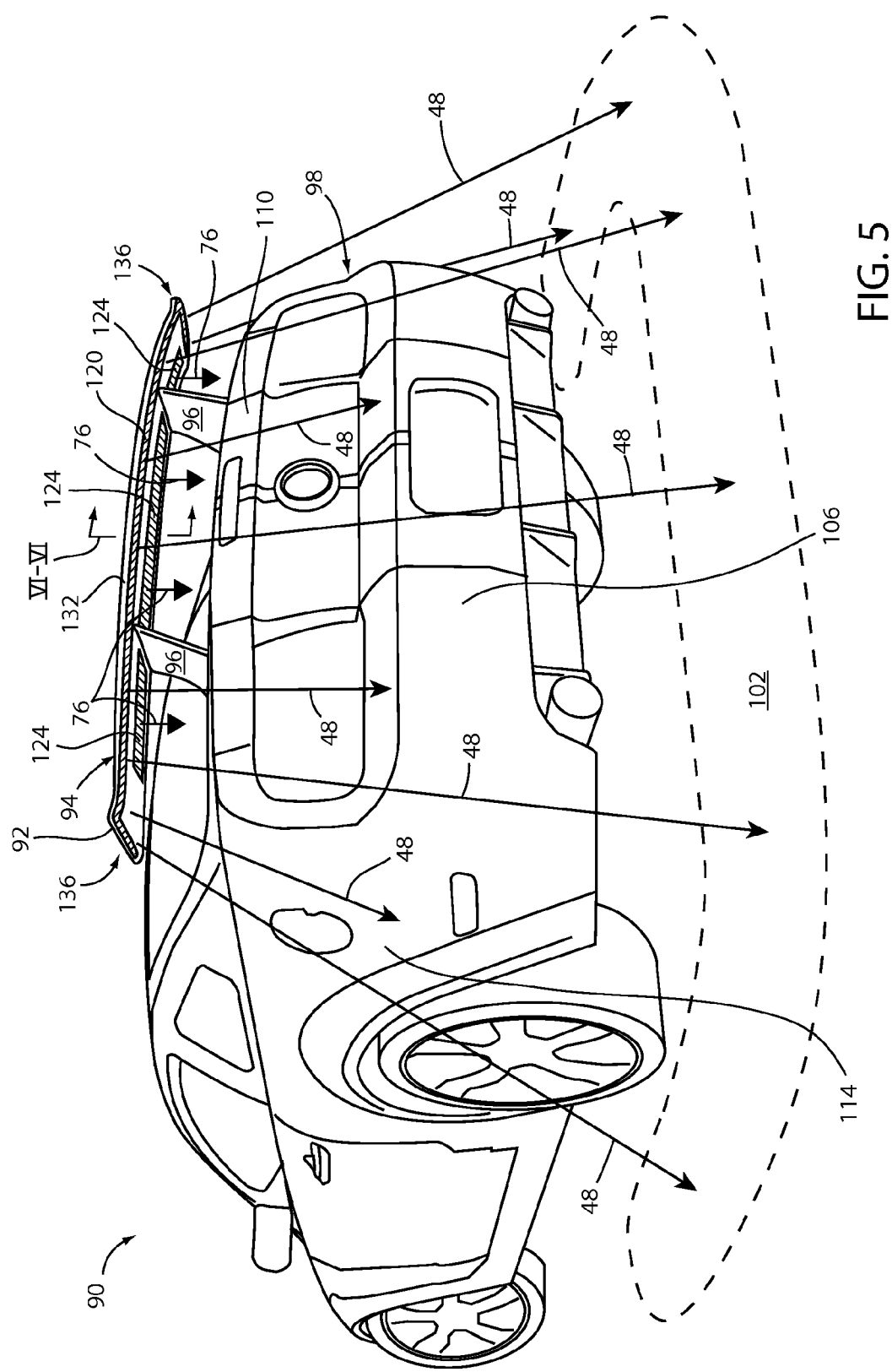
FIG. 5 is a perspective view of a vehicle having a photoluminescent illumination system incorporated in a spoiler, according to one embodiment.
Figure 6:
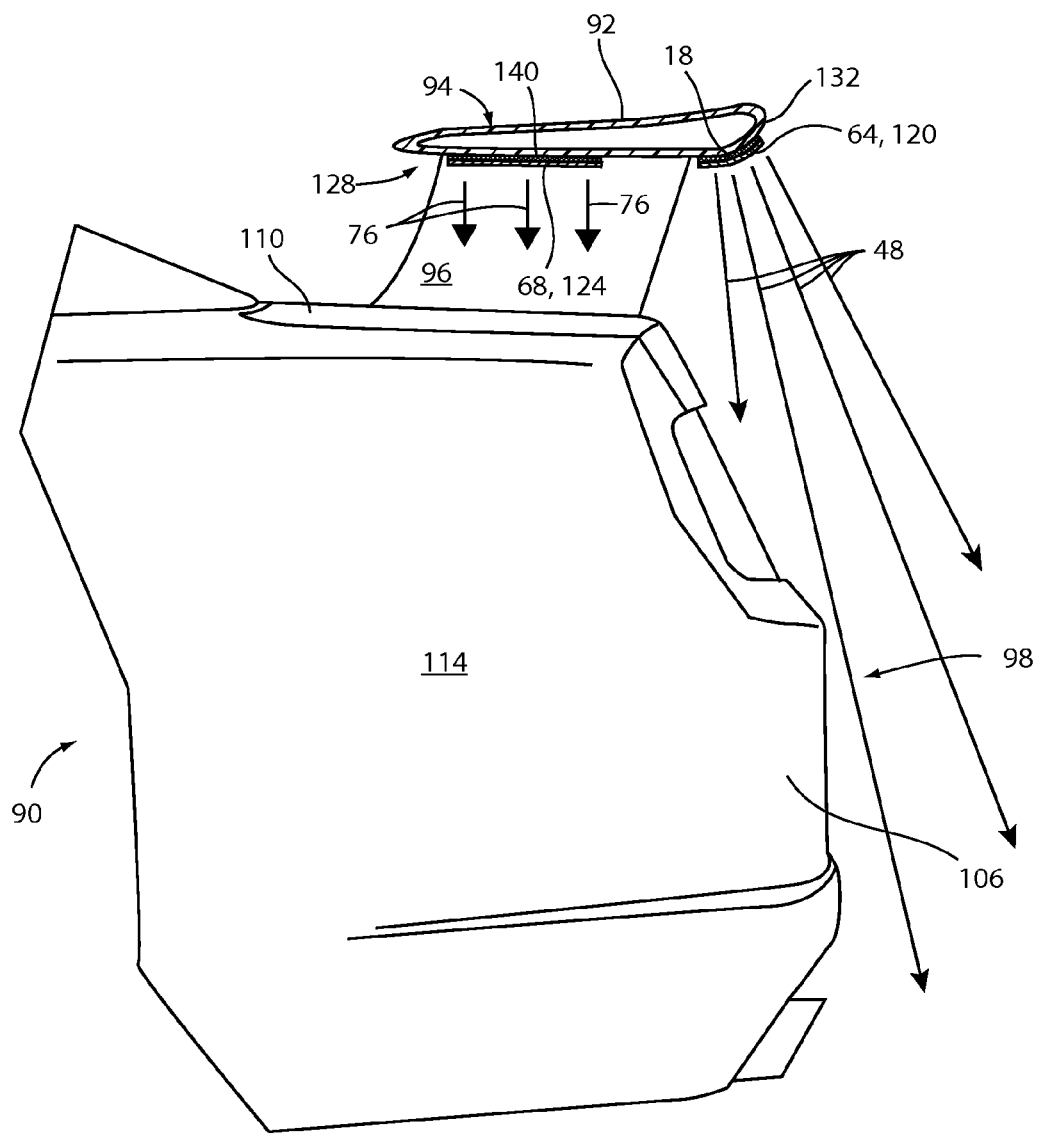
FIG. 6 is a cross-sectional view along line VI-VI of FIG. 5 further illustrating the photoluminescent illumination system.

Referring to FIGS. 5-6, a vehicle 90 is shown having a plurality of body features including a spoiler 94 disposed on a rear exterior portion 98 of the vehicle 90. In the depicted embodiment, the spoiler 94 includes a horizontally disposed wing 92 supported by substantially vertical supports 96. The spoiler 94 is equipped with the illumination system 40 that is configured to illuminate the rear portion 98 of the vehicle 90 and at least a portion of a surface 102 located beneath and generally rearward of the vehicle 90. The rear portion 98 of the vehicle 90 generally includes a bumper 106, trunk lid 110, and rear quarter panel portions 114 disposed on driver and passenger sides of the vehicle 90. The illumination system 40 includes a first light referred to as a wash light 120 and a second light referred to as an under spoiler light 124. The wash light 120 and under spoiler light 124 are disposed on an underside 128 of the wing 92. In operation, the wash light 120 and the under spoiler light 124 are configured to emit light so as to illuminate the rear portion 98 of the vehicle 90 and/or the surface 102.

Referring particularly to FIG. 5, as shown in the depicted embodiment, the illumination system 40 is located on the underside 128 of the wing 92 of the spoiler 94. The wash light 120 is disposed along a vehicle rearward edge 132 of the spoiler 94 and wraps around left and right side ends 136 of the wing 92. In some embodiments, the wing 92 may be of such a length that the ends 136 are disposed over the rear quarter panel portions 114. The wash light 120 is positioned on the bottom peripheral edge of the spoiler 94 such that when in operation the emitted light illuminates the rear portion 98 of the vehicle 90 as well as the surface 102 located beneath the vehicle 90. With the wash light 120 extending around the ends 136 of the spoiler 94, the wash light 120 is capable of illuminating light not only behind the vehicle 90, but also the rear quarter panel portions 114 and portions of the surface 102 proximate thereto.

As shown in FIG. 5, the under spoiler light 124 is located on the bottom surface of the wing 92 and is vehicle forward on the spoiler 94 with respect to the wash light 120. In the depicted embodiment, the wash light 120 and the under spoiler light 124 are separated, but may also be in contact or adjacent with one another. In yet another embodiment, the functions of both lights may be carried out by a single unitary light. In operation, the under spoiler light 124 is configured to illuminate an area under the spoiler 94 with an ambient light; generally on the trunk lid 110 and the rear quarter panel portions 114. The ambient light provided by the under spoiler light 124 is generally not visible to a driver while seated in a driver's seat of the vehicle 90. In some embodiments, the under spoiler light 124 may only extend between the substantially vertical supports 96 of the spoiler 94, while in the depicted embodiment the under spoiler light 124 extends outboard of the supports 96.

FIG. 6 depicts a cross sectional view of the spoiler 94 of FIG. 5, to reveal greater detail. According to the embodiment shown, the first photoluminescent portion 64 is configured as the wash light 120 and covers the light source 18 such that it is in physical contact with the light source 18. In such an embodiment, the activation of the light source 18 excites the wash light 120 with the first emission 44 such that it emits the second emission 48. The second emission 48 from the wash light 120 then illuminates the rear portion 98 of the vehicle 90 and the surface 102 below the vehicle 90. As described above, the light source 18 is capable of varying levels of intensity which may alter the perceived color of the second emission 48. Greater intensity from the light source 18 may increase the intensity of the second emission 48 thereby increasing the illumination of the vehicle 90 and the surface 102. For example, in one embodiment the wash light 120 may provide an ambient illumination of the rear portion 98 of the vehicle 90 in a first color (e.g., red) after a first predefined event (e.g., activation of a running light system of the vehicle 90), but provide an increased intensity light at a second color (e.g., white) upon the happening of a second predefined event (e.g., when an electronic key fob of the vehicle 90 approaches within a predefined distance to the vehicle 90.)

The light source 18 may be a printed light source (e.g., printed LED sheet) which is applied to the underside 128 of, or incorporated into, the spoiler 94. In embodiments using a printed light source, the wash light 120 may be applied to the light source 18 and/or underside 128 in any of the ways outlined above in connection with the photoluminescent structure 10 including screen printing, spraying, and roller coating. Additionally, where the light source 18 is a printed LED sheet, the wash light 120 may be individually applied on each LED of the sheet. Embodiments utilizing a printed LED sheet as the light source 18 are desirable because printed light sources require less space than convention light sources. In alternative embodiments, the light source 18 may include a plurality of LEDs that have been sunk into the spoiler 94 and provided with appropriate optics to disperse the first emission 44 to the wash light 120. Appropriate optics may include Fresnel lenses, light diffusing fibers, light pipes, or other methods of dispersing the first emission 44 substantially uniformly to the wash light 120.

Referring again to FIG. 6, in the depicted embodiment, the second photoluminescent portion 68 is configured as the under spoiler light 124. Similar to the wash light 120, the second photoluminescent portion 68 covers the second light source 140 such that the under spoiler light 124 may be in physical contact with the second light source 140. The second light source 140 may also be configured to emit the first emission 44 such that the under spoiler light 124 converts the first emission 44 into the third emission 76. The second light source 140 may be joined or combined with the spoiler 94 in any of the ways described in connection with the light source 18. Further, the under spoiler light 124 may be applied to the second light source 140 in any of the manners described in connection with the light source 18. The third emission 76 is emitted from the under spoiler light 124 and directed downward away from the spoiler 94 to illuminate an area under the spoiler 94; generally the trunk lid 110 and upper rear quarter panel portions 114. The third emission 76 is typically not viewable by the driver of the vehicle 90 while seated in the driver's seat, but may be seen by onlookers of the vehicle 90, including drivers of other vehicles. The second light source 140 is capable of varying intensities of emission such that the intensity of the third emission 76 may be altered depending on the current use of the under spoiler light 124. For example, the under spoiler light 124 may provide a colored (e.g., red) ambient light upon the happening of a first predefined event (e.g., initiation of a running light system of the vehicle 90); however, a second predefined event (e.g., initiation of a braking system of the vehicle 90) may cause the intensity of the third emission 76 to increase.

Figure 7:
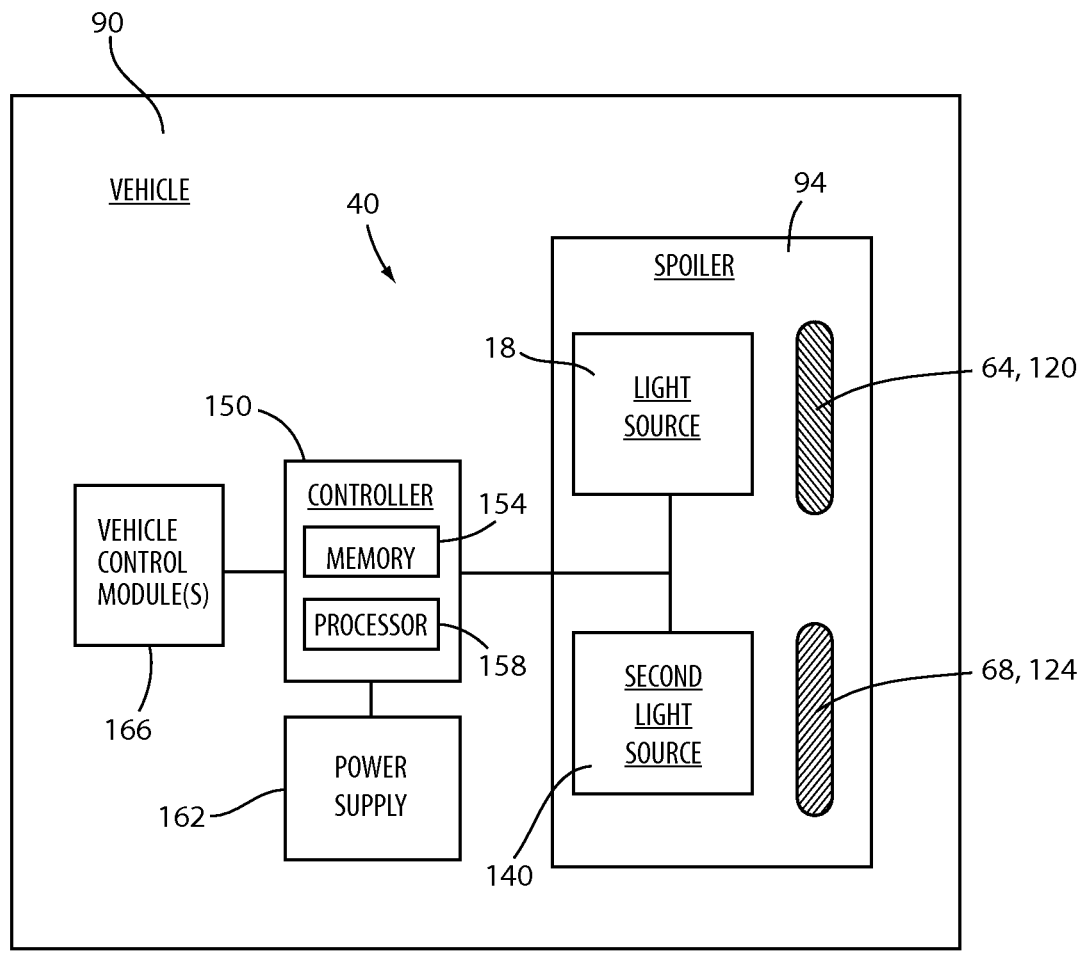
FIG. 7 is a block diagram further illustrating the vehicle photoluminescent illumination system.

Referring to FIG. 7, a block diagram of the vehicle 90 is shown in which the illumination system 40 is implemented on the spoiler 94. The illumination system 40 includes a controller 150 in communication with the light source 18 and the second light source 140 of the spoiler 94. The controller 150 may include memory 154 having instructions contained therein that are executed by a processor 158 of the controller 150. The controller 150 may provide electrical power to either of the light sources 18, 140 via a power supply 162 located onboard the vehicle 90. In addition, the controller 150 may be configured to control the light output, or intensity, of the light sources 18, 140 based on feedback received from one or more vehicle control modules 166 such as, but not limited to, a body control module, engine control module, steering control module, brake control module, the like, or a combination thereof. By controlling the light output of the light sources 18, 140, the wash light 120 and under spoiler light 124 may illuminate in a variety of colors and/or patterns to provide ambient light or useful vehicle information to onlookers of the vehicle 90. For example, the illumination provided by the wash light 120 may be used for numerous vehicle applications, such as, but not limited to, decorative illumination, a vehicle finding feature, a remote start indicator, a door lock indicator, a door ajar indicator, a warning indicator, a turn indicator, a brake indicator, safety lighting for approaching occupants, etc. Similarly, the under spoiler light 124 may alternatively, or in conjunction with the wash light 120, be used for any of the aforementioned uses.

In operation, the wash light 120 or under spoiler light 124 may exhibit a constant unicolor or multicolor illumination. For example, the controller 150 may prompt the light sources 18, 140 to emit only the first wavelength of light to cause the wash light 120 to illuminate in the first color (e.g., white). Alternatively, the controller 150 may prompt under spoiler light 124 to emit only the second wavelength of light to cause the under spoiler light 124 to illuminate in the second color (e.g., red).

In another embodiment, the wash light 120 and under spoiler light 124 may exhibit illumination only after the occurrence of one or more predefined events. For example, the memory 154 of the controller 150 may be preprogrammed with a variety of events, the detection or occurrence of one of the events triggering the controller 150 of the illumination system 40 to prompt the light sources 18, 140 to emit the first emission 44, and thereby illuminate one or both of the wash light 120 and under spoiler light 124. Such events may include an electric key fob for the vehicle 90 entering within a predefined distance to the vehicle 90, activation of a running lights system for the vehicle 90, initiation of an alert by the vehicle 90, braking of the vehicle 90, and/or activation of a decorative illumination feature of the vehicle 90. In a detailed example, upon the controller 150 being notified that the electric key fob has come within a predetermined distance, such as approximately thirty (30) feet of the vehicle 90, the wash light 120 may be activated to illuminate the rear portion 98 of the vehicle 90 and the surface 102 beneath the vehicle 90 to provide the approaching occupant with safe and illuminated access to the vehicle 90.

Accordingly, an illumination system employing an illuminating spoiler has been advantageously described herein. The illumination system may provide various benefits including a simple and cost-effective means to produce a variety of illumination that may be used as a styling feature and/or to provide safety oriented illumination to vehicles.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination system for a vehicle, comprising:
    a vehicle having a rear spoiler;
    first and second photoluminescent portions disposed on the spoiler; and
    at least one light source configured to emit an emission at a first wavelength,
    wherein the first and second photoluminescent portions are configured to convert the first wavelength to at least a second wavelength longer than the first wavelength,
    wherein the first and second photoluminescent portions respectively illuminate different areas around the vehicle.

2. The illumination system of claim 1, wherein at least one light source is in physical contact with one of the first and second photoluminescent portions.

3. The illumination system of claim 1, wherein the at least one light source is a printed light emitting diode sheet.

4. The illumination system of claim 1, wherein the first photoluminescent portion is configured to illuminate a rear portion of the vehicle.

5. The illumination system of claim 4, wherein the first photoluminescent portion is configured to illuminate a surface beneath the vehicle.

6. The illumination system of claim 1, wherein the second photoluminescent portion is configured to illuminate an area under the spoiler.

7. The illumination system of claim 1, wherein the first and second photoluminescent portions are disposed on an underside of the spoiler.

8. An illumination system for a vehicle, comprising:
    a vehicle having a rear spoiler;
    a photoluminescent portion disposed on an underside of the rear spoiler; and
    a light source located proximate the photoluminescent portion configured to emit light at a first wavelength,
    wherein the photoluminescent portion is configured to convert the first wavelength to at least a second wavelength longer than the first wavelength to illuminate a rear portion of the vehicle.

9. The illumination system of claim 8, wherein the light source is in physical contact with the photoluminescent portion.

10. The illumination system of claim 9, wherein the light source is a printed light emitting diode sheet.

11. The illumination system of claim 8, wherein the photoluminescent portion is configured to illuminate a surface beneath the vehicle.

12. The illumination system of claim 8, wherein the photoluminescent portion comprises first and second photoluminescent portions and a second photoluminescent portion is disposed on the body feature.

13. The illumination system of claim 12, wherein the second photoluminescent portion is configured to illuminate an area under the spoiler.

14. A method for illuminating an exterior of a vehicle comprising:
   activating a light source in response to a pre-defined event;
   directing light at a first wavelength from the light source toward a photoluminescent portion disposed on an underside of a rear spoiler; and
   converting light at the first wavelength to a second longer wavelength with the photoluminescent portion to illuminate a rear portion of the vehicle.

15. The method according to claim 14, further comprising the step of:
   illuminating an area underneath the spoiler with the light at the second wavelength.

16. The method according to claim 14, further comprising the step of:
   illuminating a surface located under the vehicle with the light at the second wavelength.

17. The method according to claim 14, wherein the pre-defined event is the activation of a running light system of the vehicle.

18. The method according to claim 14, wherein the pre-defined event is an electronic key fob of the vehicle entering within a predefined distance to the vehicle.

19. The method according to claim 14, wherein the pre-defined event is an application of a braking system of the vehicle.

* * * * *